Patented Sept. 20, 1949

2,482,731

UNITED STATES PATENT OFFICE 2,482,731

MANUFACTURE OF NATURAL CASINGS

James Gomeck, St. Joseph, Mo., assignor to Swift & Company, Chicago, Ill., a corporation of Illinois No Drawing. Application November 9, 1944, Serial No. 562,735

2 Claims. (Cl. 99—175)

This invention relates to the preparation of hog casings and more particularly to a simple and economical process of converting hog intestines into casings for edible products in which a larger yield of the more valuable smaller sized casings is obtained.

In the best commercial processes for preparing hog casings heretofore known to applicant, the hog intestines, after being cleaned in a conventional casing cleaning machine, were first stripped and then rinsed in clean water for a substantial period of time averaging about 1½ hours. The intestines were then again stripped and transferred to a bleaching vat into which a bleaching brine was admitted. This bleaching brine was a sodium chloride solution averaging around 30° salometer. The brine was maintained cold by the addition of ice so that the temperature of treatment was that of the melting point of ice in the brine solution. The intestines were allowed to remain in the brine over night, i. e., for a period ranging from approximately 14 to 20 hours. They were then washed for approximately 2 hours with clear cold tap water and again placed in a brine solution of approximately 30° salometer. This brine solution also was maintained at a temperature corresponding to the melting point of ice in the brine solution by adding ice. The casings were graded and were then ready for use or packing for shipment.

It will be apparent that the above process involved an initial soaking operation in water and included three stripping operations, two brine treating operations and one washing operation, both of the brine treating operations requiring large quantities of ice to maintain a temperature corresponding to the melting point of the ice in the brine solution. The addition of ice caused extensive dilution of the brine.

In accordance with the present invention it has been discovered that the first soaking operation in water can be omitted and in fact that the omission of such soaking operation results in the production of higher quality casings. It has also been discovered that by employing a stronger brine solution the employment of ice for cooling the brine can be omitted and that the omission of this ice in conjunction with the use of a stronger brine solution has an advantageous effect upon the resulting casings. Also by omitting the soaking step and employing two strong brine treatments, one of the stripping steps can be omitted. The improved process is, therefore, much simpler and less expensive and by actual use upon a large scale, it has been found that the intestines expand less so that a higher percentage of the more valuable smaller size or narrow casings are produced.

It is, therefore, an object of the present invention to provide an improved process of preparing hog casings from hog intestines.

Another object of the invention is to provide a process of preparing casings from hog intestines by which an increase in yield of higher quality smaller casings is accomplished.

Another object of the invention is to provide a process of preparing hog casings from hog intestines in which the number of steps considered necessary by the prior commercial practice is reduced and improved hog casings obtained.

In carrying out the process of the present invention, the hog intestines from the cleaning machine are stripped and placed directly in a bleaching vat. In the bleaching vat, the casings are subjected to treatment with a relatively strong brine of approximately 40° salometer. They are maintained in the bleaching vat for a period of time between approximately 12 and 24 hours, i. e., over night, after which the brine is removed and the intestines washed with clean cold tap water for approximately 1–2 hours. The washed intestines are then stripped and given a second treatment of strong brine of approximately 40° salometer. No ice is employed at any time. The casings are then ready for grading. A greater percentage of more valuable smaller casings is obtained by the improved process and the process is materially less expensive.

The most striking improvement in the casings is the greater percentage of smaller casings. This is largely due to the omission of the first soaking operation and the employment of strong brine which is not diluted by the addition of ice. The soaking operation formerly employed was believed to be necessary to remove blood from the intestines after they had been cleaned on the cleaning machine. It has been found, however, that this blood is effectively removed by the first strong brine treatment of the present invention. The soaking operation, moreover, caused the intestines to become porous and assume a larger size in the subsequent steps of the process. By placing the intestines directly in a strong brine solution, the enlargement of the intestines resulting from soaking is eliminated. Also the strong brine prevents bacterial action which takes place in weaker brine solutions even though refrigerated with ice and such bacterial action also softens the intestines causing them to enlarge. After the first strong brine step, it has been found that a single washing and stripping operation will result in completely cleaned intestines. Also, after the first treatment in strong brine, the intestines do not absorb water and swell or stretch in the washing operation and the following treatment of the cleaned intestines in strong brine results in high quality casings ready to be graded and used or packed for shipment.

Casings which grade medium, narrow medium, or narrow are much more valuable and have a much higher selling price than casings which grade extra wide, medium wide, or special medium. It has been found as a result of large scale operations that the percentage of desired casings by the present process may be increased from 3 per cent to 5 per cent over the prior process, the percentages being based on the total amount of casings being treated in a given process. For example, I have found a yield of narrow medium casing of about 17 per cent as compared to about 13 per cent by the prior process. Similarly the percentage of narrow casings has been raised from about 2 per cent to about 4 per cent. Also the percentage of medium casings was raised from 30 per cent to 34 per cent. The percentages of the less valuable larger casings were correspondingly lowered. In large scale operations the increase in percentages of more valuable casings represents an important increase in value of the products.

While specific times of treatment with the high strength brine have been given, these times may vary through a relatively wide range, for example, from 12 to 48 hours without deleterious effect upon the casings. The washing operation between the brine treatments may range from about ½ hour to 2 hours depending on the temperature, the shorter time being used at the higher temperatures. The temperature of the washing treatment usually runs around 50° F.–80° F. although it may occasionally vary from 35° F.–90° F. This washing should be sufficiently thorough to remove substantially all the salt and blood liberated in the prior brine treatment. Although a 40° salometer is preferred in the brine treatments, it will be apparent that the strength of this brine may be varied somewhat, for example, between 37° and 42° salometer, with the stronger brines in the range given, giving the best results. It is possible to use brines as strong as 60° salometer, but they are usually uneconomical. The temperature of the brine treatment may vary from about 50° F.–80° F. The strength of the brine is regulated according to the temperature, i. e. the stronger brine is used at the higher temperature and vice versa. The control of the brine is determined by the operator as a result of experience and skill.

It will be apparent from the above that I have provided a simpler and less expensive process for obtaining finished hog casings from hog intestines since the number of operations have been reduced and the employment of ice or other refrigerants is not required. Furthermore, improved casings are obtained and a larger percentage of more valuable smaller casings result from the process.

While I have disclosed the preferred embodiment of my invention, it is to be understood that the details thereof may be varied within the scope of the following claims.

I claim:

1. In the process of producing improved natural casings from fresh hog intestines wherein the intestines are first cleaned and stripped, the improvement comprising: introducing the intestines into a bleaching brine solution maintained at a temperature of between about 50° F. and 80° F. and having a brine concentration of between approximately 37° and 42° salometer, soaking said intestines in said brine solution for a period of time of between approximately 12 and 48 hours, removing said intestines from said brine solution, washing said intestines with cold tap water for about one-half hour to two hours to remove the blood and salt from said intestines, stripping said intestines, introducing said intestines into a second bleaching brine solution maintained at a temperature of between about 50° F. and 80° F. and having a brine concentration of between approximately 37° and 42° salometer, and thereafter soaking said intestines in said second-mentioned brine solution until said intestines are ready for grading, the said brine treatments causing a substantial increase in the yield of high quality small size hog casings.

2. In the process of producing improved natural casings from fresh hog intestines wherein the intestines are first cleaned and stripped, the improvement comprising: introducing the intestines into a bleaching brine solution maintained at a temperature of between about 50° F. and 80° F. and having a brine concentration of approximately 40° salometer, soaking said intestines in said brine solution for a period of time of between approximately 12 and 24 hours, removing said intestines from said brine solution, washing said intestines with cold tap water for about one to two hours to remove the blood and salt from said intestines, stripping said intestines, introducing said intestines into a second bleaching brine solution maintained at a temperature of between about 50° F. and 80° F. and having a brine concentration of approximately 40° salometer, and thereafter soaking said intestines in said second-mentioned brine solution until said intestines are ready for grading, the said brine treatments causing a substantial increase in the yield of high quality small size hog casings.

JAMES GOMECK.

REFERENCES CITED

The following references are of record in the file of this patent:

UNITED STATES PATENTS

| Number | Name | Date |
|---|---|---|
| 1,497,088 | Carey | June 10, 1924 |
| 2,360,374 | Topjian | Oct. 17, 1944 |
| 2,381,813 | Epst | Aug. 7, 1945 |

FOREIGN PATENTS

| Number | Country | Date |
|---|---|---|
| 315,752 | Great Britain | Aug. 16, 1928 |

OTHER REFERENCES

"The Packers Encyclopedia," published by The National Provisioner, Chicago, Copyright 1922, pages 115 and 116.

"By-Products in the Packing Industry," by R. A. Clemen, published by the University of Chicago Press, Chicago, Ill., pages 268 to 271.